(12) United States Patent
Mirau et al.

(10) Patent No.: US 10,300,962 B2
(45) Date of Patent: May 28, 2019

(54) AXLE CARRIER WITH IMPROVED LOAD PATH

(71) Applicant: Benteler Automobiltechnik GmbH, Paderborn (DE)

(72) Inventors: Alex Mirau, Hoevelhof (DE); Oliver Seibt, Paderborn (DE); Guenter Fortmeier, Delbrueck (DE); Matthias Koerner, Bielefeld (DE); Frank Hoecker, Ibbenbueren (DE); Kim-Henning Sauerland, Bielefeld (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 64 days.

(21) Appl. No.: 15/496,903

(22) Filed: Apr. 25, 2017

(65) Prior Publication Data
US 2017/0305473 A1    Oct. 26, 2017

(30) Foreign Application Priority Data
Apr. 26, 2016   (DE) .......................... 10 2016 107 740

(51) Int. Cl.
*B62D 21/09*    (2006.01)
*B62D 21/11*    (2006.01)
(Continued)

(52) U.S. Cl.
CPC ........... *B62D 29/001* (2013.01); *B62D 21/09* (2013.01); *B62D 21/11* (2013.01); *B62D 27/065* (2013.01); *B62D 29/005* (2013.01); *B62D 29/041* (2013.01); *B60Y 2304/03* (2013.01); *B60Y 2304/05* (2013.01)

(58) Field of Classification Search
CPC .. B62D 29/001; B62D 29/005; B62D 29/041; B62D 21/09; B62D 21/11; B62D 27/065; B62D 2304/03; B62D 2304/05
See application file for complete search history.

(56) References Cited

U.S. PATENT DOCUMENTS

| | | | |
|---|---|---|---|
| 6,511,096 B1 * | 1/2003 | Kunert | B60G 7/02 280/124.109 |
| 2002/0033594 A1 * | 3/2002 | Yamamoto | B60G 7/02 280/781 |

(Continued)

FOREIGN PATENT DOCUMENTS

| | | |
|---|---|---|
| DE | 102011102467 A1 | 11/2012 |
| DE | 102011085383 A1 | 5/2013 |

(Continued)

OTHER PUBLICATIONS

Office Action for Chinese Application No. 201710256027.0 dated Oct. 23, 2018; 17pp.

*Primary Examiner* — Drew J Brown
(74) *Attorney, Agent, or Firm* — Hauptman Ham, LLP

(57) ABSTRACT

An axle carrier for a motor vehicle is disclosed having at least two attachment points, a metallic upper shell and a lower shell of fiber composite material coupled to the metallic upper shell. A first load path extending through the metallic upper shell between the at least two attachment points in an edge region, and a second load path shorter that the first load path extending through the lower shell.

6 Claims, 5 Drawing Sheets

(51) Int. Cl.
*B62D 27/06* (2006.01)
*B62D 29/00* (2006.01)
*B62D 29/04* (2006.01)

(56) References Cited

U.S. PATENT DOCUMENTS

| | | | | |
|---|---|---|---|---|
| 2003/0107200 | A1* | 6/2003 | Huang | B60G 7/02 |
| | | | | 280/93.515 |
| 2010/0102543 | A1* | 4/2010 | Kang | B62D 21/11 |
| | | | | 280/784 |
| 2011/0215545 | A1* | 9/2011 | Buschjohann | B62D 21/11 |
| | | | | 280/124.109 |
| 2012/0223187 | A1* | 9/2012 | Kismarton | B64C 1/068 |
| | | | | 244/120 |
| 2013/0241186 | A1* | 9/2013 | Shibaya | B62D 21/11 |
| | | | | 280/781 |
| 2014/0232143 | A1 | 8/2014 | Renner et al. | |
| 2015/0353135 | A1* | 12/2015 | Wolf | B62D 21/11 |
| | | | | 280/781 |
| 2016/0052564 | A1 | 2/2016 | Graefe et al. | |
| 2016/0090129 | A1* | 3/2016 | Keller | B32B 5/26 |
| | | | | 280/784 |
| 2016/0194029 | A1* | 7/2016 | Kramer | B60G 21/0555 |
| | | | | 280/124.109 |
| 2016/0347369 | A1* | 12/2016 | Haselhorst | B60G 21/0551 |

FOREIGN PATENT DOCUMENTS

| | | |
|---|---|---|
| DE | 102014112090 A1 | 2/2016 |
| EP | 2578473 A1 | 4/2013 |

\* cited by examiner

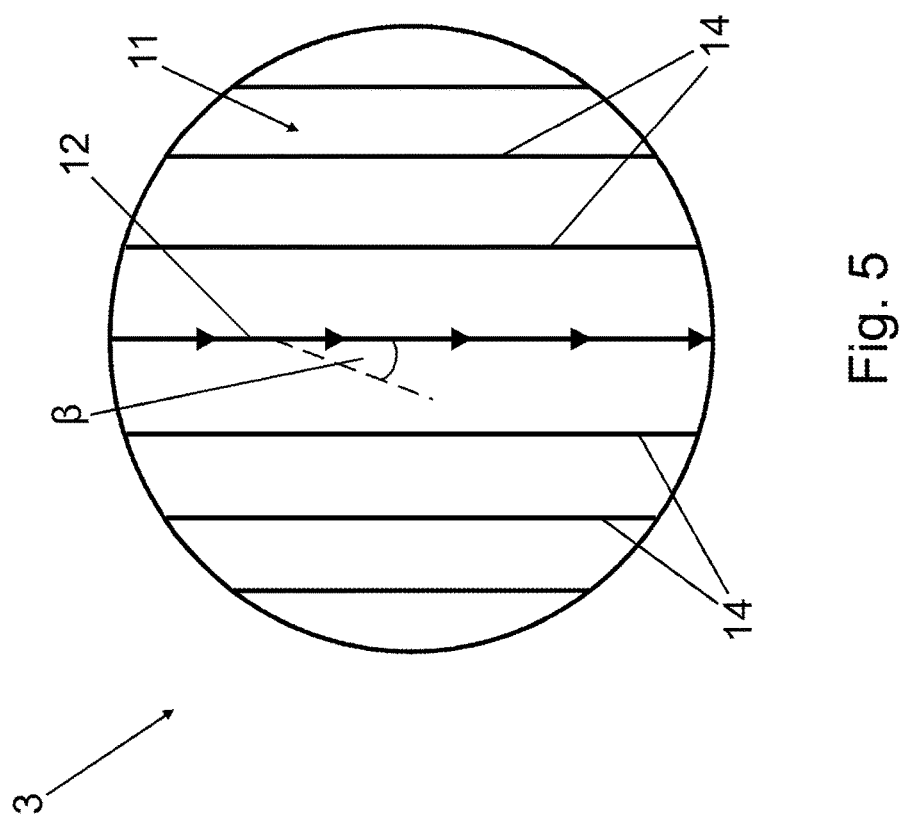

AXLE CARRIER WITH IMPROVED LOAD PATH

CROSS REFERENCE TO RELATED APPLICATIONS

The present application claims priority to German Application Number 10 2016 107 740.2 filed Apr. 26, 2016.

BACKGROUND OF THE INVENTION

1. Field of the Invention

The present invention relates to a motor vehicle component, and more specifically, to in an axle carrier or an axle sub-frame.

2. Description of the Related Art

Prior art axle carriers of a type of being self carrier bodies which are fastened below the body. The prior art axle carriers generally serve to accommodate axle components, for example, links. The axle carrier is an integral constituent part of a multilink axle. The axle carrier is also referred to as an axle sub-frame.

Prior art axle carriers are usually formed as a welded component, with a plurality of profiled components, tubular components and/or formed components being welded to one another.

However, it is also known to produce axle carriers with a hybrid design having, for example, sheet metal components which are coupled to a fiber composite component. An axle carrier of the generic type is known for example from DE 10 2014 112 090 A1.

Another example of an axle carrier for a motor vehicle is shown in EP 2 578 473 A1, in which the axle carrier comprises crossmembers and longitudinal members, and at least one half-shell of fiber-reinforced plastic which has a U-shaped profile which is stabilized by reinforcing ribs. Other similar axle carriers are known from DE 10 2011 102 467 A1 and DE 10 2011 085 383 A1.

SUMMARY OF THE INVENTION

It is therefore an object of the present invention to provide an axle carrier which has a low intrinsic weight and low manufacturing costs, but is at the same time improved in terms of its stiffness behavior.

The aforementioned object is achieved by an axle carrier for a motor vehicle in accordance with the present invention.

The axle carrier for a motor vehicle has at least two attachment points and is designed as a hybrid component. The axle carrier has a metallic upper shell and a lower shell of fiber composite material coupled thereto. The two attachment points are spaced apart from one another. A load path extends through the upper shell between the two attachment points in an edge region of the axle carrier. A load path likewise also extends in this edge region through the lower shell. The load path of the lower shell is shorter than the load path through the upper shell.

A load path is to be understood as meaning within the context of the invention a path through a component along which an introduced force migrates through the component. Thus, with an introduced force, stresses are present in the component along the load path. The load path is thus understood to mean a concentrated or resulting main path. Smaller stresses are present in the parallel direction or else deviating therefrom.

One advantage of such configuration is that inwardly directed geometries thus corresponding to constrictions, recesses or curvatures extend between the attachment points in the metallic upper shell in accordance with the installation space requirements and/or with the material use of the relatively heavy metallic material. This can be in particular in the case of axle carriers through the arrangement of drive shafts, transfer units, steering mechanisms or the like. The lower shell of fiber composite material protrudes or projects outwardly with respect to these inwardly directed geometries of the upper shell. A shorter or more direct connection between the two spaced-apart attachment points is thus made possible by the projecting part of the lower shell, with the result that a shorter load path through the lower shell is also obtained by comparison with the load path through the upper shell. In particular, the load paths within the context of the invention are oriented in the motor vehicle transverse direction or in the motor vehicle longitudinal direction. The transverse stiffness or longitudinal stiffness is increased by this approach according to the invention. The installation space made available for arranging, for example, a transfer unit, a gearbox or else a drive rod is influenced only insignificantly, if at all.

The metallic upper shell can be produced, in particular, in one piece and of the same material, preferably formed as a shell component. In particular, the metallic upper shell can be formed from light metal or else from a steel material. However, the metallic upper shell can also be produced as a joining component, in particular a welded component. For example, individual tubular components or profiled components can also be preformed and subsequently welded to one another. In addition, use can be made of individual formed components which are then welded to the tubular components or profiled components. The upper shell is then coupled to the lower shell. This can occur, in particular, by positive coupling, preferably screwing. In addition, or as an alternative, integrally bonded coupling, in particular adhesive bonding, can occur. The area of the lower shell is preferably larger than the area of the upper shell, as seen in the plan view oriented in the motor vehicle vertical direction. The lower shell and upper shell are designed to extend flat in particular in the motor vehicle longitudinal direction and transverse direction and bear at least partially against one another.

The attachment points themselves can be body attachment points. However, they can also be attachment points for a corresponding link. The attachment points are preferably formed on the upper shell.

An upper shell which is designed very particularly preferably as a one-piece formed sheet metal component of the same material and which has an inwardly directed recess in its edge region, the lower shell is designed to project flat on its underside outwardly beyond the recess. The projecting part of the lower shell then forms a shorter load path between the attachment points. The recess can also take the form of a bent portion, concave portion, or curved portion. In particular, the recess extends between the two attachment points over a large part of the length of the spacing, more than 50%, preferably more than 60%, and mores specifically more than 70%.

Moreover, the projecting part of the lower shell may be in form of a rectilinear connection between the attachment points. This occurs either directly through a straight line through a respective center point of the attachment points or else offset parallel to a straight line which extends through the center points of the attachment points. The transmitted tensile and/or compressive force between the attachment points is, however, taken up by the shorter load path of the lower shell, in particular the rectilinear connection with higher stiffness of the axle carrier. The stiffness of the axle carrier according to the invention to tensile and/or compressive forces introduced through the attachment points is considerably improved by the shortened load path according to the invention in the lower shell.

It is a further object of the invention to have a woven or non-crimp fabric to be used to produce the lower shell of fiber-composite material, preferably a fabric with aligned fibers which have a length of preferably more than 10 cm. These fiber strands extend in an oriented manner in the projecting part or along the load path through the lower shell. Here, the orientation extends parallel to the load path. Up to 5°, preferably up to 10°, in particular up to 15° or else 20° deviation of the orientation of the fibers from the course of the load path is also still deemed as extending with a parallel orientation within the context of this invention. The resistance, in particular for transmitting compressive forces, over the load path is thereby increased.

It is a further object of the invention for the lower shell to have in particular loading-optimized wall thicknesses which differ from one another at least in certain regions. A targeted use of fiber composite material and thus a weight optimization is the advantage.

The lower shell is further designed to be substantially flat and can optionally or additionally have ribs and/or reinforcing geometries, with the result that the connection stiffness but also the tensile or compressive strength in the motor vehicle longitudinal direction and motor vehicle transverse direction is increased. The ribs and/or reinforcing geometries are preferably formed in one piece and of the same material in the lower shell.

BRIEF DESCRIPTION OF THE DRAWINGS

The present invention will now be described, by way of example, with reference to the accompanying drawings, in which:

FIG. 5 illustrates an enlarged cross sectional view of the projecting part.

In the figures, the same reference designations are used for identical or similar components, even if a repeated description is omitted for reasons of simplicity.

DETAILED DESCRIPTION OF SOME EMBODIMENTS

Figure 1:
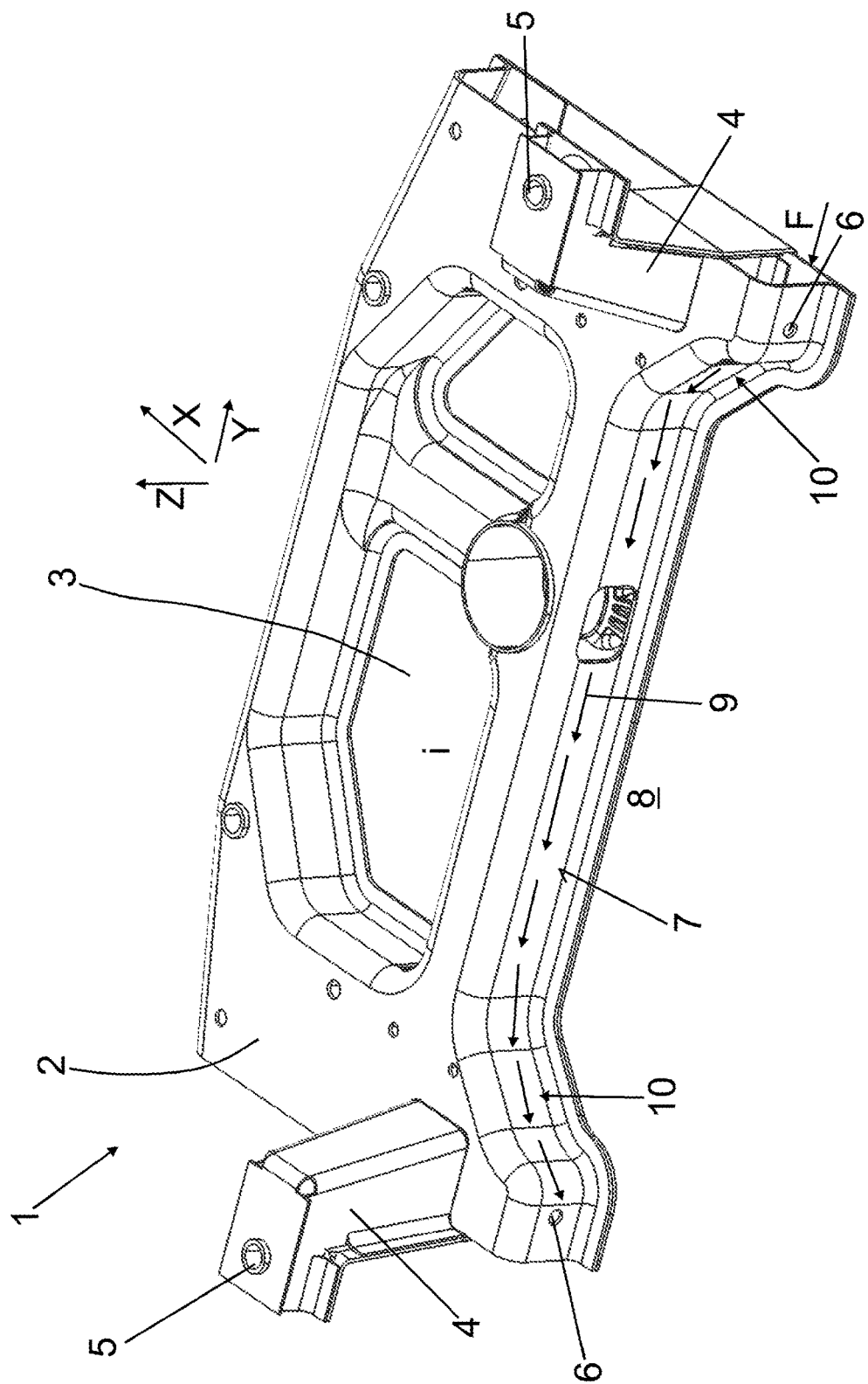
FIG. 1 illustrates a perspective view of an axle carrier known from the prior art.

FIG. 1 illustrates an axle carrier 1 known from the prior art. The axle carrier has an upper shell 2 and a lower shell 3. Both upper shell 2 and lower shell 3 each extend areally in the motor vehicle longitudinal direction X and in the motor vehicle transverse direction Y. Considering the motor vehicle vertical direction Z, the upper shell 2 projects relative to the lower shell 3. Furthermore, the tower-like elevations 4 of the upper shell 2 each extend laterally in the motor vehicle vertical direction Z and have body attachment points 5. The attachment points 6 for pivotable coupling to links (not shown in more detail) are illustrated on the plane of the image in the front region. An inwardly directed recess 8 is formed on the upper shell 2 opposite an edge region 7. If a compressive force F is then introduced in the motor vehicle transverse direction Y at the right attachment point 6 with respect to the plane of the image, a load path 9 is obtained essentially through the edge region 7, in particular through the upper shell 2. This load path 9 particularly follows the course through the bending points 10 of the recess 8.

Figure 2:
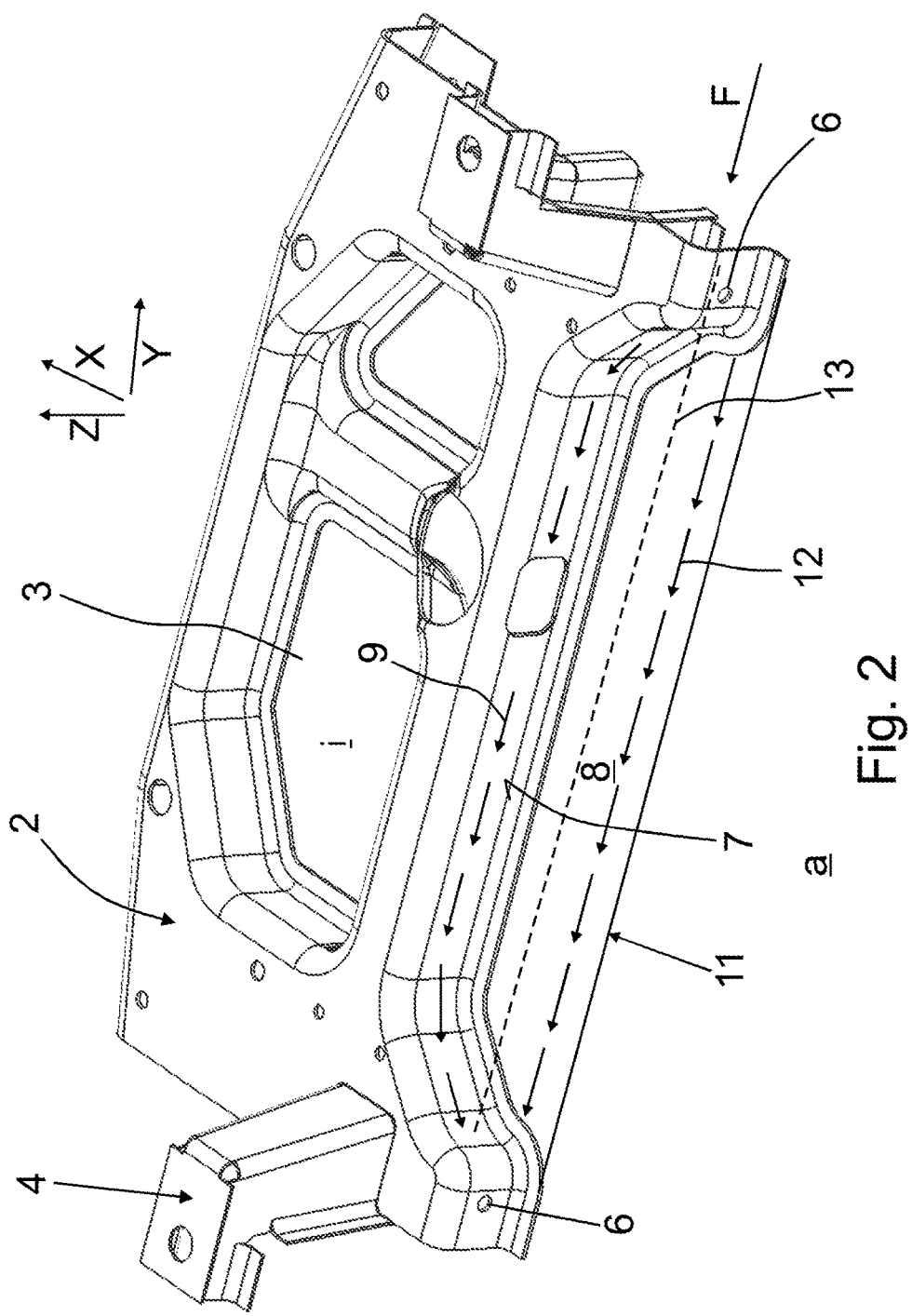
FIG. 2 illustrates an axle carrier according to the invention with a projecting part of the lower shell.

As see in FIG. 2, the lower shell 3 has a projecting part 11. This projecting part 11 projects outwardly a with respect to the recess 8. A portion of the introduced compressive force F extends through a load path 12 through the lower shell 3. This load path 12 is shorter than the load path 9 through the upper shell 2 through which the remaining portion of the introduced compressive force F extends. More specifically, the transverse stiffness of an axle carrier 1 is thus improved by the projecting part 11. The installation space created by the recess 8 in particular in the edge region 7 of the upper shell 2 is only insignificantly compromised, if at all, by the projecting part 11. In the example shown here, the load path 12 according to the invention through the lower shell 3 extends parallel with respect to a direct connecting straight line 13 between the two attachment points 6, in particular being offset downward in the motor vehicle vertical direction Z.

Figure 3:
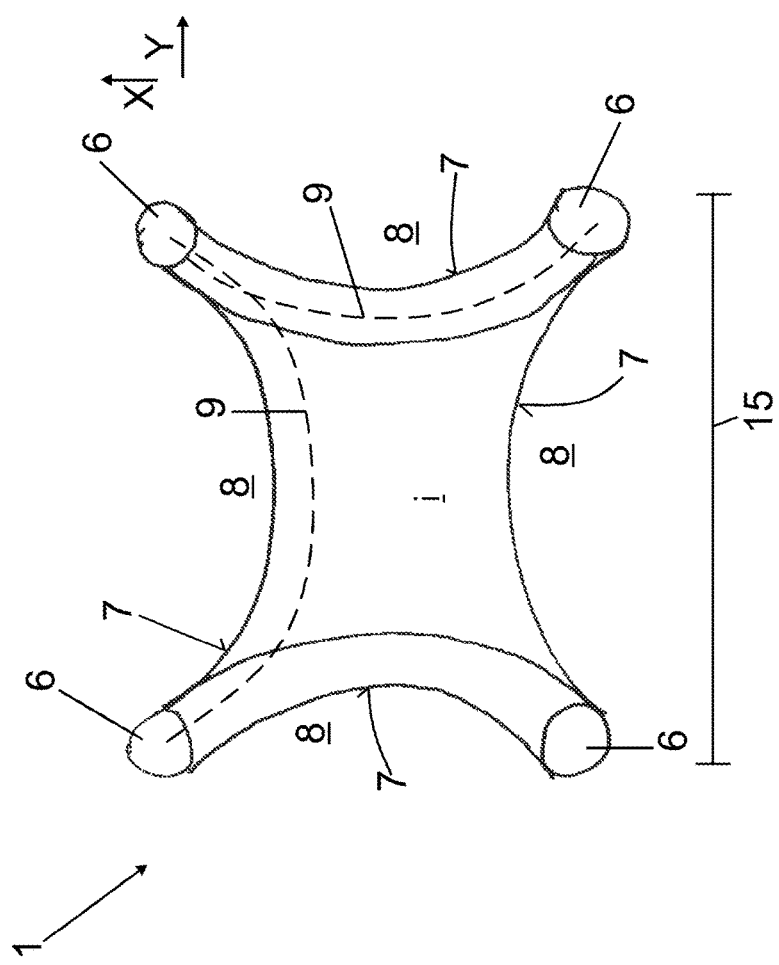
FIG. 3 illustrates a sectional view of the axle carrier from the prior art.

FIG. 3 shows schematically illustrates the axle carrier 1 shown in FIG. 1. The axle carrier can be configures as a front axle carrier 1 or rear axle carrier. A recess 8 is formed inwardly in each of the respective edge regions 7 between two attachment points 6. The recess 8 can be formed on all sides, or else only on one, two or three sides. The load path 9 resulting therefrom in each case between two attachment points in the motor vehicle transverse direction Y or motor vehicle longitudinal direction X thus has an arcuate or curved course. The attachment points 6 can be designed as body attachment points 5 or link attachment points. The attachment points 6 have a spacing 15 from one another. The recess 8 extends over a large part, in particular more than 50% of the spacing 15.

Figure 4:
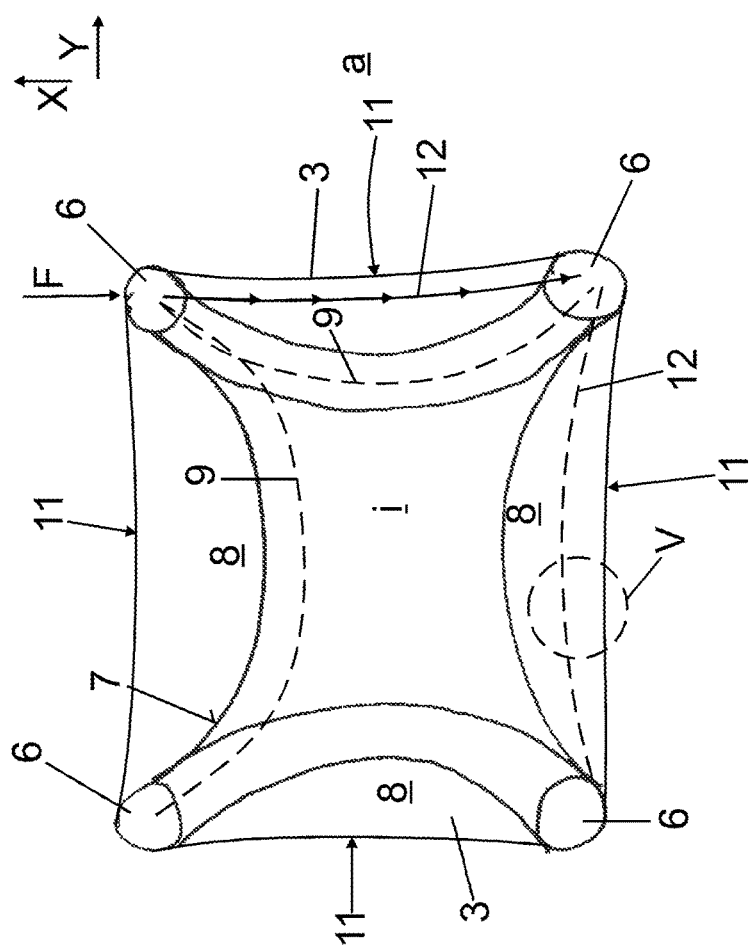
FIG. 4 illustrates the sectional view of the axle carrier with lower shell and projecting part.

As best seen in FIG. 4, a lower shell 3 of fiber composite material is formed to project outwardly beyond the respective recess 8. The projecting part 11 thus forms a shortened load path 12 between the attachment points 6, the shortened load path 12 then extending through the lower shell 3.

FIG. 5 illustrates an enlarged sectional portion of the projecting part 11 shown in FIG. 4. As best seen, the direction of the load path 12 is the enlarged view through the projecting part 11 of the lower shell 3. The fibers 14 contained herein have an orientation which is essentially offset parallel to the course of the load path 12. However, fibers with an orientation at an angle β of up to 10°, in particular up to 20°, to the load path 12 are also understood as being included within the context of this invention. Not all the fibers must have the same orientation. Preferably, more than 50%, in particular more than 60%, preferably more than 70%, and in some cases more than 80% of the fibers 14 have an orientation in the direction of or offset parallel to the load path 12.

The foregoing description of some embodiments of the invention has been presented for purposes of illustration and description. It is not intended to be exhaustive or to limit the invention to the precise form disclosed, and modifications and variations are possible in light of the above teachings or may be acquired from practice of the invention. The specifically described embodiments explain the principles and practical applications to enable one ordinarily skilled in the art to utilize various embodiments and with various modifications as are suited to the particular use contemplated. It is intended that the scope of the invention be defined by the claims appended hereto, and their equivalents. Further, it should be understood that various changes, substitutions and alterations can be made hereto without departing from the spirit and scope of the invention as described by the appended claims.

The invention claimed is:

1. An axle carrier for a motor vehicle, comprising:
   at least two attachment points;
   a metallic upper shell having an inwardly directed recess in an edge region,
   a lower shell of fiber composite material coupled to the metallic upper shell, the lower shell having a projecting part which projects beyond the inwardly directed recess and is a direct rectilinear connection between the at least two attachment points;
   a first load path extending through the metallic upper shell between the at least two attachment points in the edge region; and
   a second load path extending through the projecting part of the lower shell between the at least two attachment points, wherein the second load path is shorter than the first load path.

2. The axle carrier as claimed in claim 1, wherein fiber strands in the lower shell extend in an oriented manner parallel to the second load path of the lower shell.

3. The axle carrier as claimed in claim 1, wherein the lower shell is substantially flat and/or wherein the lower shell has ribs and/or reinforcements.

4. The axle carrier as claimed in claim 1, wherein the lower shell and upper shell are coupled to one another positively and/or in an integrally bonded manner.

5. The axle carrier as claimed in claim 1, wherein the at least two attachment points are configured as body attachment points and/or for coupling to links to form a motor vehicle axle.

6. The axle carrier as claimed in claim 1, wherein the metallic upper shell is a one-piece component made of the same material or wherein the metallic upper shell is a joining component.

* * * * *